United States Patent
Sakyo et al.

(10) Patent No.: US 6,209,949 B1
(45) Date of Patent: Apr. 3, 2001

(54) OPERATOR'S CAB IN CONSTRUCTION MACHINE

(75) Inventors: Tsuyoshi Sakyo, Ibaraki; Toichi Hirata, Ushiku; Kazuhisa Tamura, Ishioka; Jun Sonoda, Abiko; Takashi Nakagawa, Ibaraki, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/203,666

(22) Filed: Dec. 1, 1998

(30) Foreign Application Priority Data

Dec. 4, 1997 (JP) .................................................. 9-334463

(51) Int. Cl.⁷ .................................................. B60R 27/00
(52) U.S. Cl. .............................. 296/190.08; 296/190.03; 296/203.02; 296/203.03; 296/203.04
(58) Field of Search ..................... 296/188, 190.01, 296/190.03, 190.08, 194, 195, 203.01, 203.02, 203.03, 203.04, 30

(56) References Cited

U.S. PATENT DOCUMENTS

| | | | |
|---|---|---|---|
| 4,135,756 | * 1/1979 | Hausmann | 296/190.03 |
| 4,550,948 | * 11/1985 | Hamada et al. | 296/202 |
| 4,669,565 | * 6/1987 | Miki et al. | 180/89.12 |
| 4,763,925 | * 8/1988 | Onoe et al. | 280/808 |
| 5,388,885 | * 2/1995 | Warren | 296/203.03 |
| 5,560,672 | * 10/1996 | Lim et al. | 296/189 |
| 5,609,385 | * 3/1997 | Daniel et al. | 296/188 |
| 5,641,194 | * 6/1997 | Honma et al. | 296/188 |
| 5,720,510 | * 2/1998 | Daniel et al. | 296/188 |
| 5,782,525 | * 7/1998 | Honma et al. | 296/188 |
| 5,941,597 | * 8/1999 | Horiuchi et al. | 296/203.01 |

FOREIGN PATENT DOCUMENTS 9-25648  1/1997  (JP) .

* cited by examiner

Primary Examiner—D. Glenn Dayoan
Assistant Examiner—Patricia Engle
(74) Attorney, Agent, or Firm—Oliff & Berridge, PLC (57) ABSTRACT

An operator's cab in a construction machine in which hollow pillar portions are formed each with an outer panel and an inner panel bonded to each other and the hollow pillar portions constitute an operator's cab frame, includes at least one reinforcement member constituted of thin plate that is bonded to the outer panel and/or the inner panel to divide an internal space of each of the hollow pillar portions.

6 Claims, 13 Drawing Sheets

OPERATOR'S CAB IN CONSTRUCTION MACHINE

INCORPORATION BY REFERENCE

The disclosures of the following priority applications are herein incorporated by reference:

Japanese Patent Application No. 9-334463 filed Dec. 4, 1997.

BACKGROUND OF THE INVENTION

1. Field of the Invention

The present invention relates to an operator's cab (room) in a construction machine such as a hydraulic shovel, a wheel loader or the like.

2. Description of the Related Art

Safety in construction machines has been pursued with increasing vigor in recent years, and various standards have been set forth in order to protect operators or passengers inside the operator's cab by hypothesizing various conditions that may occur during operation at a construction site, such as, for instance, an object falling from above, an object flying from the front, or the machine tipping over. One of such standards, the TOPS (tipping over protective structure) specifies that when the machine body tips over and the tipping load is placed on the upper portion of the side surfaces of the operator's cab of a hydraulic shovel resulting in the frame that constitutes the operator's cab becoming deformed, the deformed member be prevented from entering the vicinity of the operator's seat provided inside the operator's cab from the viewpoint of operator or passenger protection.

The structures adopted for operator's cabs of hydraulic shovels in the prior art include one that is constituted by bonding an inner panel provided toward the operator's cab and an outer panel provided on the outside of the inner panel, and further distending a portion of the inner panel and a portion of the outer panel inward and outward respectively relative to the operator's cab to form hollow pillar portions. In order to satisfy the need for improving the strength of the operator's cab in an operator's cab structure such as this provided with pillar portions, reinforcement member constituted of steel pipe or steel bar may be inserted inside the hollow pillar portions to improve the strength against a tipping load, as disclosed in, for instance, Japanese Laid-open Patent Publication No. Heisei-9-25648.

However, when a commercially available product such as a steel pipe or a steel bar is used as a reinforcement member to be inserted inside a hollow pillar portion, the size of the steel pipe or the steel bar to be used is subject to restriction imposed by the shape of the pillar if the reinforcement member is to be inserted while maintaining the existing pillar shape, and thus, it is difficult to achieve an optimal shape for the pillar portion in terms of strength. In addition, if the pillar shape is changed to accommodate the steel pipe or the steel bar, it will lead to a major design modification and an increase in the production cost.

SUMMARY OF THE INVENTION

An object of the present invention is to provide an operator's cab in a construction machine whose strength can be improved effectively without having to greatly change the shape of pillars in an existing operator's cab.

In order to attain the above object, an operator's cab in a construction machine according to the present invention in which hollow pillar portions are formed each with an outer panel and an inner panel bonded to each other and the hollow pillar portions constitute an operator's cab frame, comprises: at least one reinforcement member constituted of thin plate that is bonded to the outer panel and/or the inner panel to divide an internal space of each of the hollow pillar portions.

In this operator's cab in a construction machine, preferably, a modulus of section in each of the hollow pillar portions is gradually increased toward a bottom surface of the operator's cab frame to lessen bending stress at the hollow pillar portion.

Also, preferably, the reinforcement member is bonded to a base plate constituting a bottom portion of the operator's cab.

Also, the reinforcement member can be distanced from a base plate constituting a bottom portion of the operator's cab.

Also, preferably, the hollow pillar portions are each constituted of elongated space and the reinforcement member is provided along a direction of length of the elongated space.

Also, preferably, the hollow pillar portions are provided at, at least, one set of left and right ends among left and right ends at a front surface of the operator's cab, left and right ends at a rear surface of the operator's cab and left and right ends in a middle area located between the left and right ends at the front surface and the left and right ends at the rear surface of the operator's cab.

Also, preferably, a cross sectional shape of the reinforcement member has a roughly square bracket shape.

Another operator's cab in a construction machine according to the present invention in which hollow pillar portions are formed each with an outer panel and an inner panel bonded to each other and the hollow pillar portions constitute an operator's cab frame, comprises: at least one reinforcement member constituted of thin plate that is bonded to an outer side of each hollow pillar portion to form a hollow portion outside the internal space of the hollow pillar portion.

In this operator's cab in a construction machine, preferably, a cross sectional shape of the reinforcement member has a roughly square bracket shape, too.

Another operator's cab in a construction machine according to the present invention in which hollow pillar portions are formed each with an outer panel and an inner panel bonded to each other and the hollow pillar portions constitute an operator's cab frame, comprises: mid hollow pillar portions that are provided at left and right ends in a middle area located between a front surface and a rear surface of the operator's cab; and a reinforcement member that is provided at each of the mid hollow pillar portions.

In this operator's cab in a construction machine, preferably, the reinforcement member is constituted of thin plate and furthermore a cross sectional shape of the reinforcement member has a roughly square bracket shape, too.

Another operator's cab in a construction machine according to the present invention in which hollow pillar portions are formed each with an outer panel and an inner panel bonded to each other and the hollow pillar portions and a roof which is provided above the hollow pillar portions constitute an operator's cab frame, comprises: a roof reinforcement member that extends left and right in the operator's cab and is bonded to the roof to form a hollow portion between the roof reinforcement member and the roof.

This operator's cab in a construction machine, preferably, further comprises a pillar reinforcement member at the hollow pillar portion. Furthermore, preferably, the pillar reinforcement member and the roof reinforcement member are bonded to form an integrated structure.

In this operator's cab in a construction machine, preferably, the roof reinforcement member is constituted of thin plate and furthermore a cross sectional shape of the roof reinforcement member has a roughly square bracket shape, too. Also, preferably, the hollow pillar portions are provided at, at least, one set of left and right ends among left and right ends at a front surface, left and right ends at a rear surface and left and right ends in a middle area located between the left and right ends at the front surface and the left and right ends at the rear surface of the operator's cab and the roof reinforcement member is mounted laterally between upper ends of a pair of the hollow pillar portions. Further, preferably, this operator's cab in a construction machine comprises a pillar reinforcement member at the hollow pillar portion. Also, preferably, the pillar reinforcement member and the roof reinforcement member are bonded to form an integrated structure.

DESCRIPTION OF THE PREFERRED EMBODIMENTS

The following is an explanation of the embodiment of the present invention in reference to the drawings.

Figure 1:
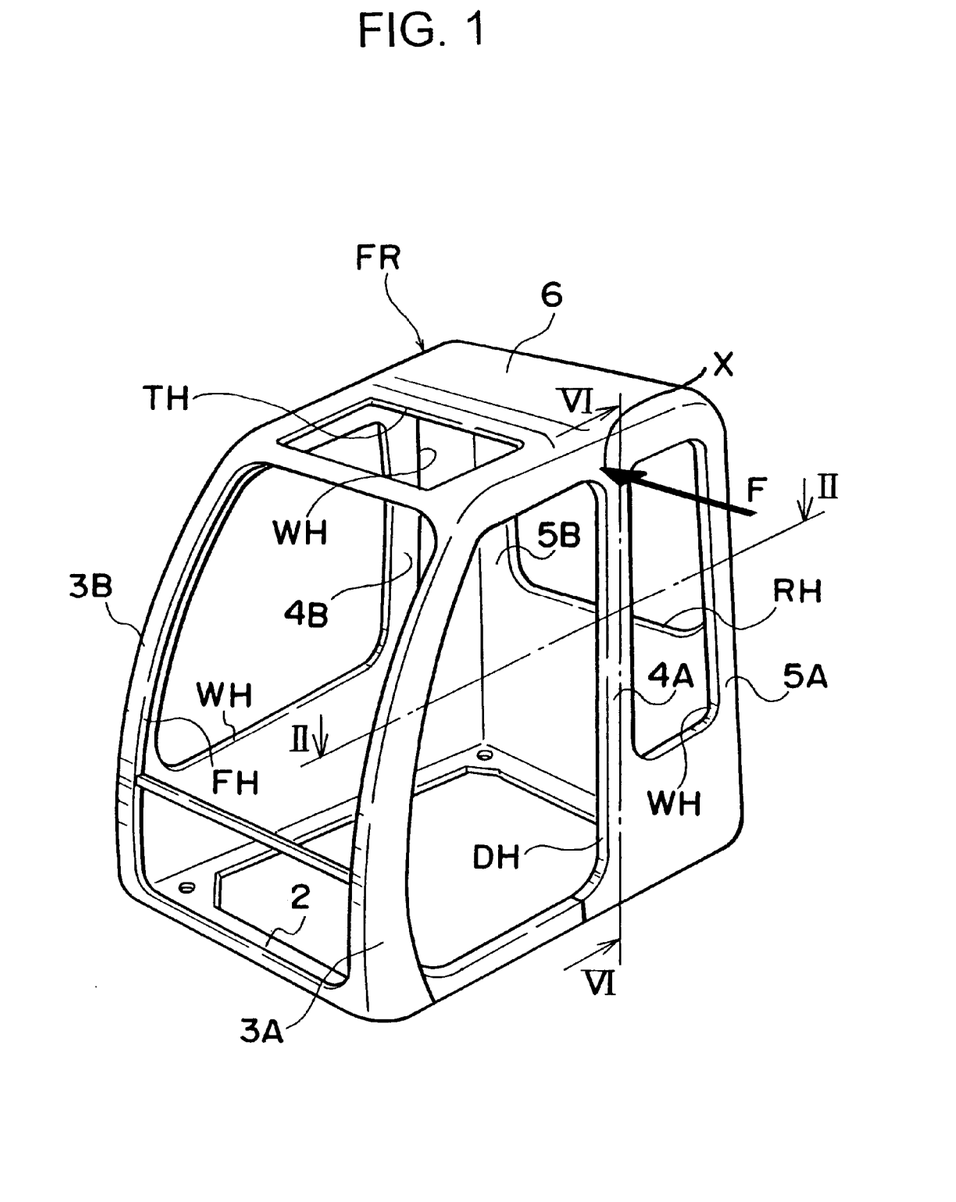
FIG. 1 shows a perspective view illustrating the frame structure of the operator's cab of a hydraulic shovel.
Figure 2:
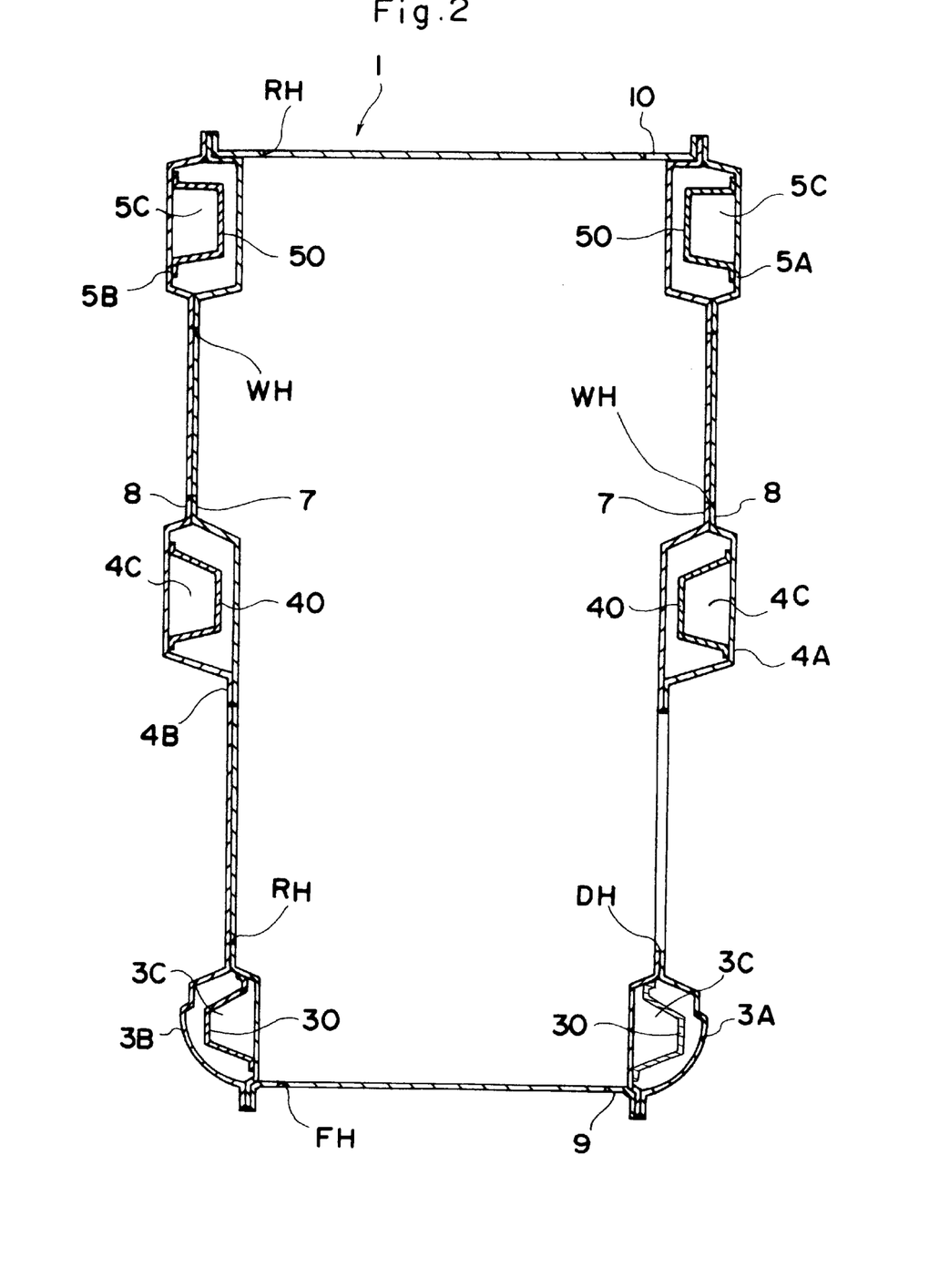
FIG. 2 shows a cross section of the operator's cab in an embodiment of the present invention along the horizontal direction.

FIG. 1 is a perspective view illustrating the frame structure of the operator's cab in an embodiment of the present invention and FIG. 2 is a cross section along line II—II in FIG. 1. As illustrated in FIG. 2, the left side surface and the right side surface of the operator's cab 1 are each constituted of a pair of panels, i.e. , an inner panel 7 and an outer panel 8, whereas the front surface and the rear surface of the operator's cab 1 are respectively constituted of a front panel 9 and a rear panel 10. The inner panel 7 and the outer panel 8 are bonded to overlap each other, and hollow (or empty) pillar portions are formed between the inner panel 7 and the outer panel 8 at the frontmost portion, the rearmost portion and the middle portion located between them, of the operator's cab 1. These pillar portions are referred to as first pillars 3A and 3B, second pillars 4A and 4B and third pillars 5A and 5B from the front to the rear, and first reinforcement members 30, 40 and 50 that are to be detailed later are provided inside the individual pillars 3A and 3B through 5A and 5B.

As illustrated in FIG. 1, the bottom surface of the operator's cab 1 is formed with a base plate 2, and the first pillars 3A and 3B through third pillars 5A and 5B are provided standing erect on the base plate 2. The top surface of the operator's cab 1 is constituted of a roof 6 provided at the upper ends of the pillars 3A and 3B through 5A and 5B. Thus, the operator's cab frame FR constituting the main frame structure of the operator's cab 1 is constituted of the individual surfaces at the front, at the rear, at the left, at the right, at the top and at the bottom to achieve a roughly rectangular parallelopiped. At the front surface and the rear surface of the operator's cab frame FR, an opening FH for mounting a front glass and an opening RH for mounting a rear glass are provided respectively, with an opening WH for mounting a window provided at both the left side surface and the right side surface of the frame FR. An opening DH for mounting a door is provided at the left side surface of the frame FR, and an opening TH for mounting a skylight is provided at the front side of the roof 6.

Figure 3:
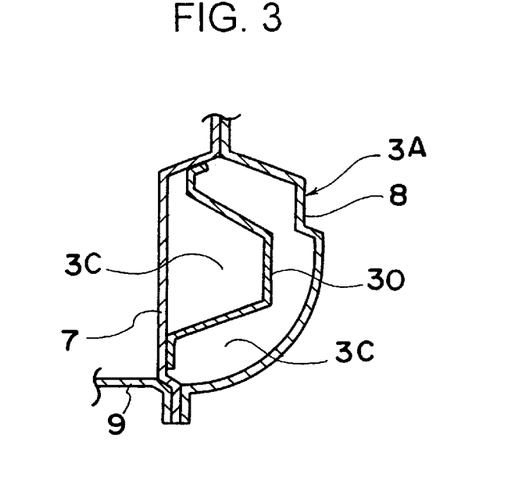
FIG. 3 shows a cross section of a first pillar in the embodiment along the horizontal direction.
Figure 4:
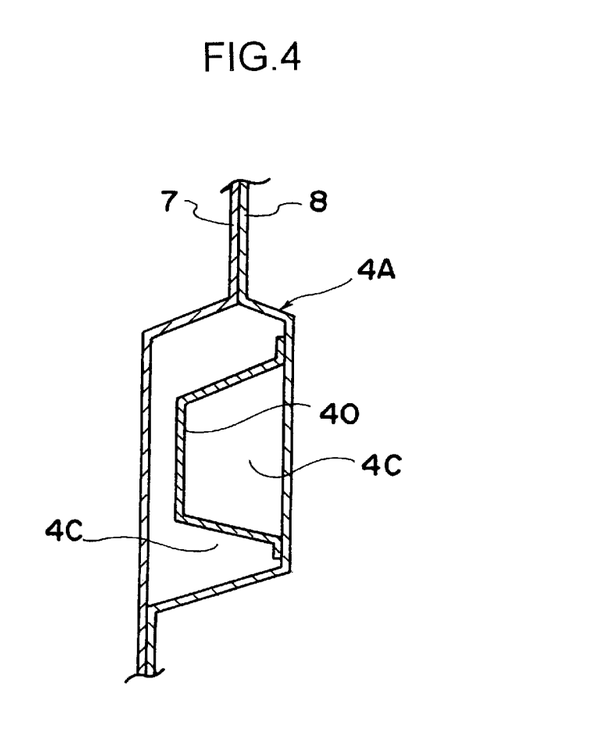
FIG. 4 shows a cross section of a second pillar in the embodiment along the horizontal direction.
Figure 5:
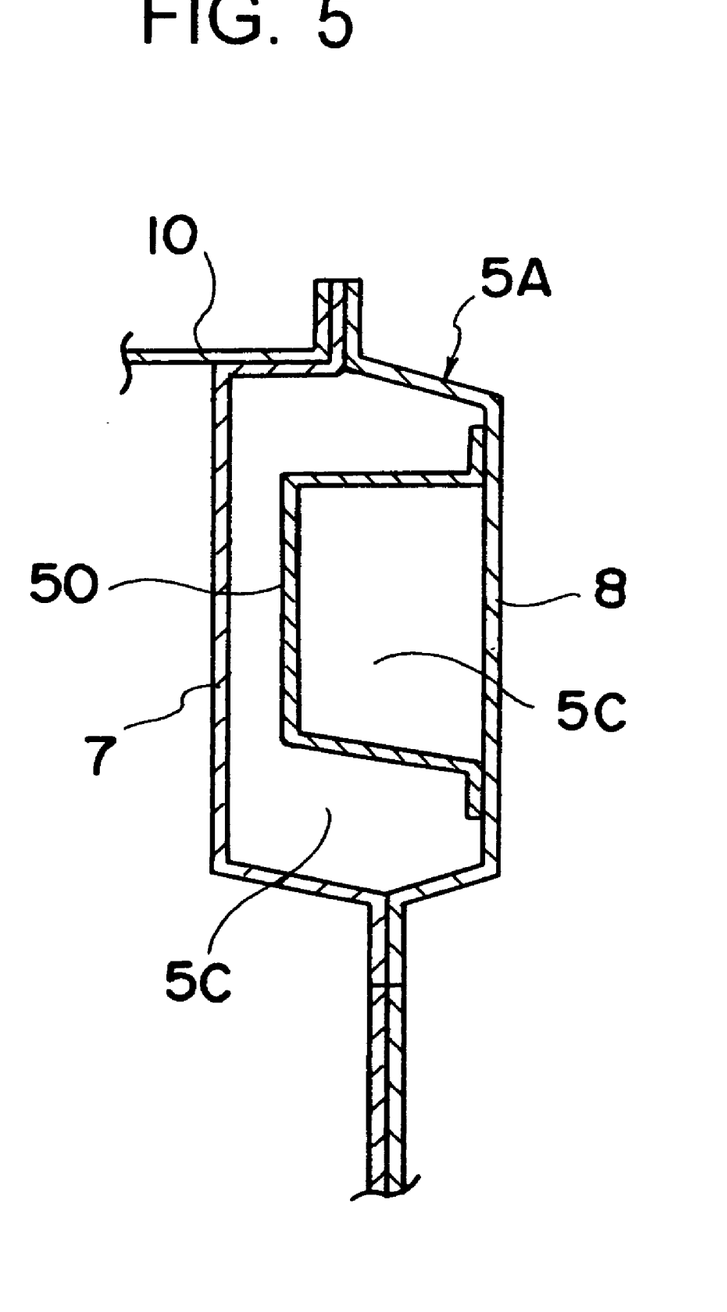
FIG. 5 shows a cross section of a third pillar in the embodiment along the horizontal direction

Next, the shapes of the pillars in this embodiment are explained in reference to FIGS. 3 through 5 that are enlargements of the first pillar 3A, the second pillar 4A and the third pillar 5A in FIG. 2. As illustrated in FIG. 3, the first pillar portion 3A is provided with a hollow portion 3C between the inner panel 7 and the outer panel 8 having cross sections achieving rough "]" shapes (Square bracket or Japanese letter "]" shape) facing opposite each other and distended inward and outward respectively, and the front and rear portions of the inner panel 7 and the outer panel 8 are bonded with each other one on top of the other. At the hollow portion 3C, a longitudinal reinforcement plate 30 with its cross section achieving a rough "]" shape to face opposite the inner panel 7 is provided and the inner surface of the longitudinal reinforcement plate 30 in the back and forth direction of the operator's cab is bonded to the inner surface of the inner panel 7 at two locations that are distanced from each other to divide the hollow portion 3C into two portions. An end of the front panel 9, with its cross section achieving an L shape, is bonded to the inner surface of the inner panel 7 at the bonding area of the inner panel 7 and the outer panel 8 toward the front. The longitudinal reinforcement member 30 is formed by press-processing a thin plate.

As illustrated in FIG. 4, the second pillar portion 4A, too, is provided with a hollow portion 4C between the inner panel 7 and the outer panel 8 having cross sections formed in rough "]" shapes facing opposite each other, as in the case with the first pillar portion 3A. At the hollow portion 4C, a longitudinal reinforcement plate 40 with its cross section achieving a rough "]" shape to face opposite the outer panel 8 is provided and the outer surface of the longitudinal reinforcement plate 40 in the back and forth direction of the operator's cab is bonded to the inner surface of the outer panel 8 at two locations that are distanced from each other to divide the hollow portion 3C into two portions. The longitudinal reinforcement member 40 is formed by press-processing a thin plate.

As illustrated in FIG. 5, the third pillar portion 5A, too, is provided with a hollow portion 5C between the inner panel 7 and the outer panel 8 having cross sections formed in rough "]" shapes facing opposite each other, as in the case with the first pillar portion 3A. At the hollow portion 5C, a longitudinal reinforcement plate 50 with its cross section achieving a rough "]" shape to face opposite the outer panel 8 is provided and the outer surface of the longitudinal reinforcement plate 50 in the back and forth direction of the operator's cab is bonded to the inner surface of the outer panel 8 at two locations that are distanced from each other to divide the hollow portion 5C into two portions. An end of the rear panel 10 having a cross section achieving an L shape is bonded to the inner surface of the inner panel 7 at the bonding area of the inner panel 7 and the outer panel 8 toward the rear. The longitudinal reinforcement member 50 is formed by press-processing a thin plate. It is to be noted that the individual pairs of pillar portions 3A and 3B through 5A and 5B constituting part of the operator's cab frame FR achieve left/right symmetry, and the pillar portions 3B, 4B and 5B whose explanation is omitted here, too, are provided with longitudinal reinforcement plates 30, 40 and 50 respectively as are the pillar portions 3A, 4A and 5A explained above.

Figure 6:
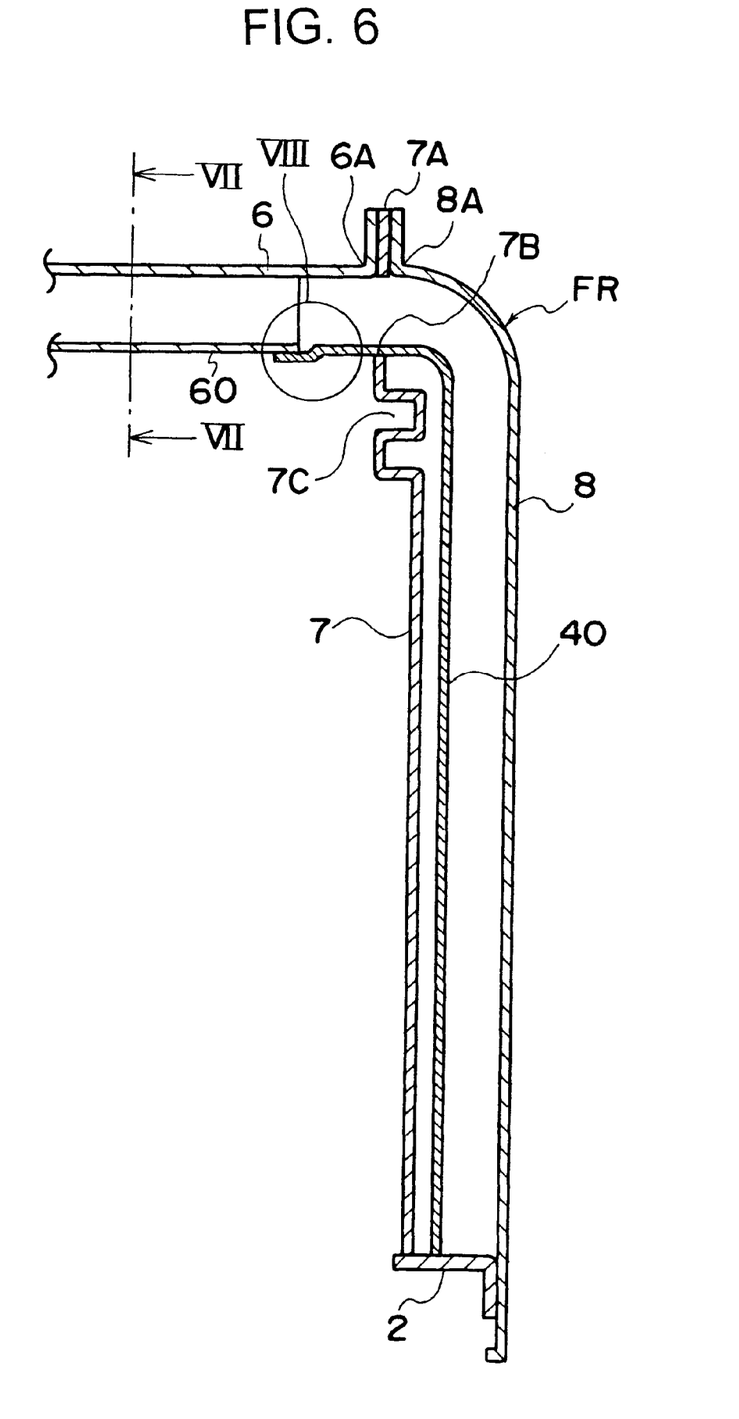
FIG. 6 shows a cross section of the second pillar in the embodiment along the vertical direction.

Next, the shapes of the longitudinal reinforcement plates 30, 40 and 50 in the vertical direction are explained in reference to FIG. 6 which is a cross section along line VI—VI in FIG. 1 (a cross section of the second pillar 4A along the vertical direction). As illustrated in FIG. 6, the lower end of the outer panel 8 is bonded to the outer surface of the base plate 2 having a cross section achieving an L shape. The upper portion of the outer panel 8 is bent toward the inside of the operator's cab 1 almost at a right angle with the inner surface of a flange 8A provided at the upper end bonded to the outer surface of the upper end 7A of the inner panel 7. On the inside of the outer panel 8, the longitudinal reinforcement member 40 mentioned earlier is provided parallel to the outer panel 8, and the lower end of the longitudinal reinforcement member 40 is bonded to the upper surface of the base plate 2. The upper portion of the longitudinal reinforcement member 40 is bent toward the inside of the operator's cab 1 almost at a right angle, with its front end passing through an opening portion 7B of the inner panel 7 opening in a shape that is the same as the cross section of the longitudinal reinforcement plate 40 to be bonded to the inner panel 7 at the opening portion 7B. The lower end of the inner panel 7 is bonded to the upper surface of the base plate 2, and a rail bend 7C for housing the front glass is provided in the upper portion of the inner panel. Exactly the same structure is assumed for the second pillar 4B.

Figure 7:
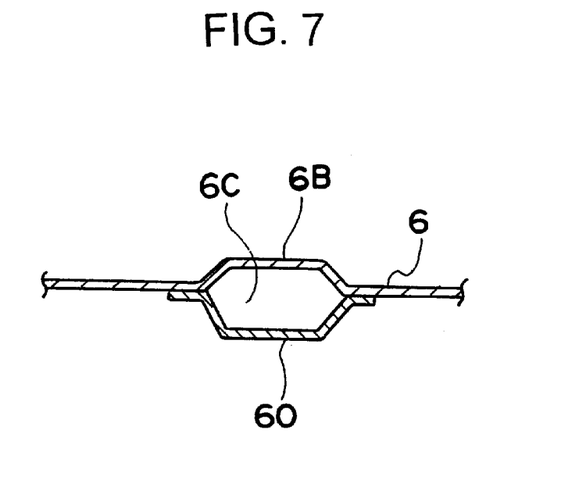
FIG. 7 shows a cross section of a side of the roof portion above the second pillar in the embodiment.
Figure 8:
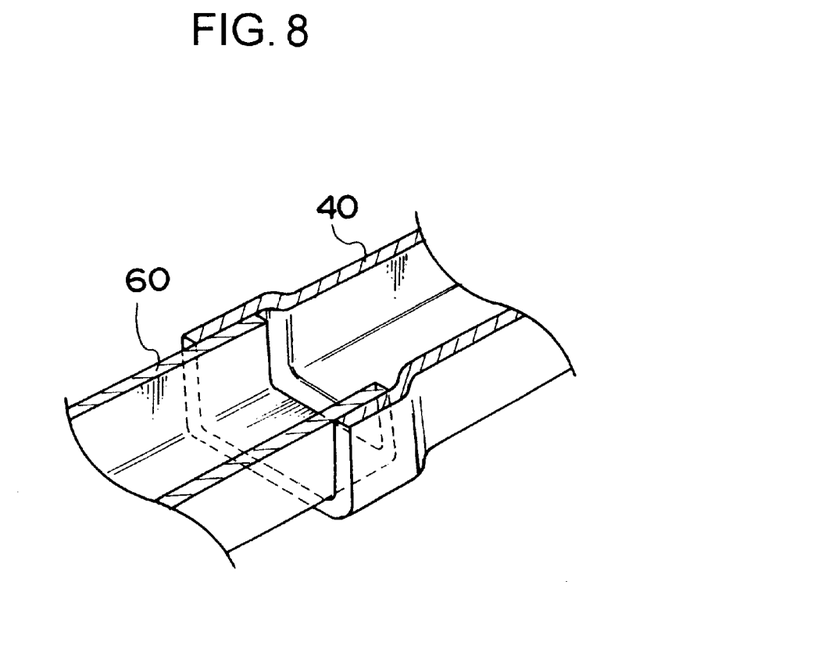
FIG. 8 shows a perspective view illustrating the bonding of a longitudinal reinforcement member and a lateral reinforcement member in the embodiment.

As illustrated in FIG. 7, which is a cross section along line VII—VII in FIG. 6, in the areas of the roof 6 where the upper ends of the second pillars 4A and 4B are bonded, a distended portion 6B extends to the left and right in the operator's cab. At the inner surface of the roof 6, a lateral reinforcement member 60 having a cross section achieving a rough "]" shape to face opposite the distended portion 6B, which extends to the left and right in the operator's cab, is bonded to the roof 6 at two locations distanced from each other in the back and forth direction of the operator's cab to form a hollow portion 6C. In addition, as illustrated in FIG. 6, a flange 6A is provided at the left end of the roof 6 (at the right end in FIG. 6), with a side surface of the flange 6A bonded to the inner surface of the upper end 7A of the inner panel. As illustrated in FIG. 8, which is a perspective view of the VIII area in FIG. 6, the left end of the lateral reinforcement member 60 (the right end portion in FIG. 6) is press-processed to achieve a staged shape (so-called joggled processing) so that the right end of the longitudinal reinforcement member 40 (the left end portion in FIG. 6) is fitted in and bonded at the staged portion. It is to be noted that hollow portions 6C constituted by distended portions 6B and lateral reinforcement members 60 are provided in the areas of the roof 6 between the first pillars 3A and 3B and between the third pillars 5A and 5B that are not shown, as in the area between the second pillars 4A and 4B. Since the reinforcement member is provided at the roof, the rigidity in the upper portion of the operator's cab improves, which, in turn, improves the strength against an object falling from above. Also, since the pillar portions, the distended portion and the lateral reinforcement member of the roof constitute elongated space, the operator's cab achieves a so-called beam structure, accordingly the strength of the operator's cab effectively improved.

Figure 9:
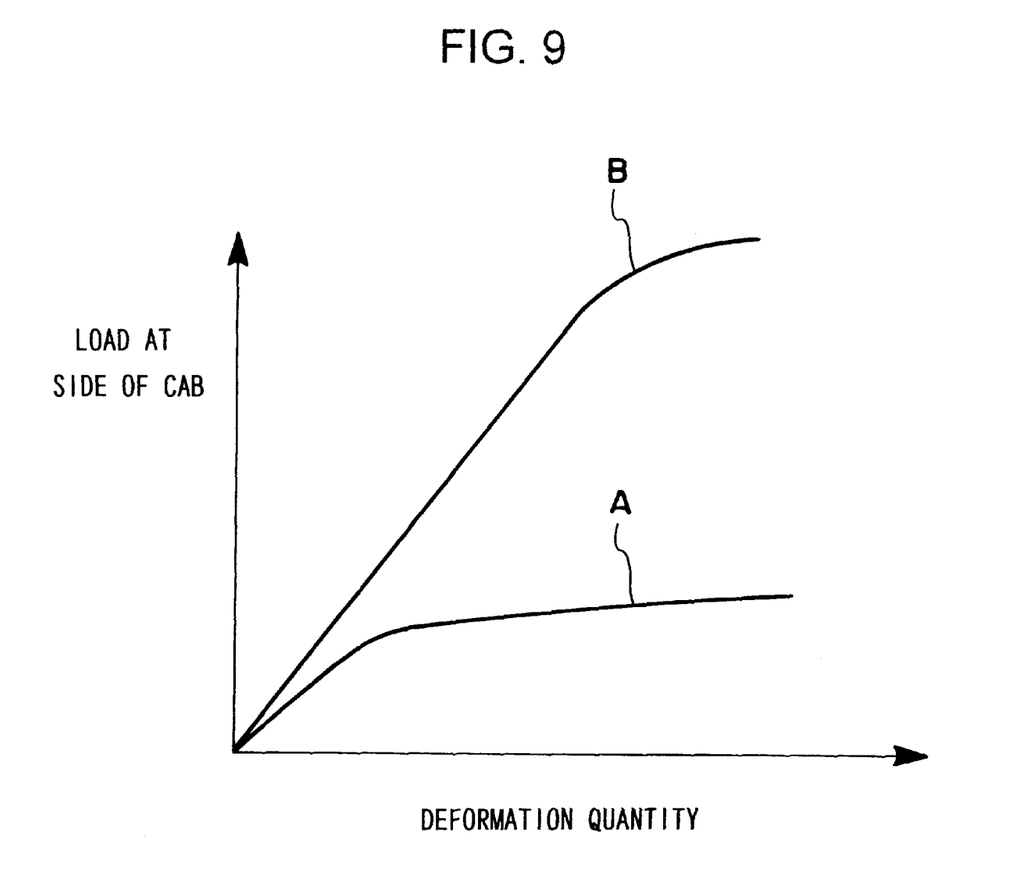
FIG. 9 shows the relationship between the tipping load applied to a side surface of the operator's cab and displacement.

A tipping load F is applied to an X portion of the operator's cab 1 at the left side (the second pillar 4A) in FIG. 1 and the relationship between the deformation quantity at the X portion and the tipping load is illustrated in FIG. 9. In the figure, the curve A represents the strength characteristics of an operator's cab in the prior art that is not provided with reinforcement members and the curve B represents the strength characteristics of the operator's cab in the embodiment provided with the reinforcement members 30, 40, 50 and 60. As illustrated in FIG. 9, the strength of the operator's cab in the embodiment demonstrates a great improvement over that in the prior art.

Thus, since the longitudinal reinforcement members 30, 40 and 50 and the lateral reinforcement members 60 constituted of thin plate are provided at the pillars 3A and 3B through 5A and 5B and the roof 6 of the operator's cab frame FR in the embodiment, the strength of the operator's cab 1 can be improved effectively without degrading of freedom in design that would otherwise result if commercially available steel pipe or steel bar were employed to constitute the reinforcement members. In addition, since the inner panel 7 and the outer panel 8 in the prior art can be utilized as is, no significant modification is required in the manufacturing process and the increase in the production cost is minimized. Furthermore, since the reinforcement members 30, 40, 50 and 60 are provided only at the pillars 3A and 3B through 5A and 5B and the roof 6 constituting the main frame of the operator's cab 1, the increase in weight due to the use of the reinforcement members can be minimized to ensure that the operating performance and the like are not adversely affected.

While the shape of the longitudinal reinforcement member 30 provided at the first pillar 3A is illustrated in FIG. 3, the shape of the reinforcement member 30 may be as illustrated in FIGS. 10 through 14, instead, and these alternatives are explained below.

Figure 10:
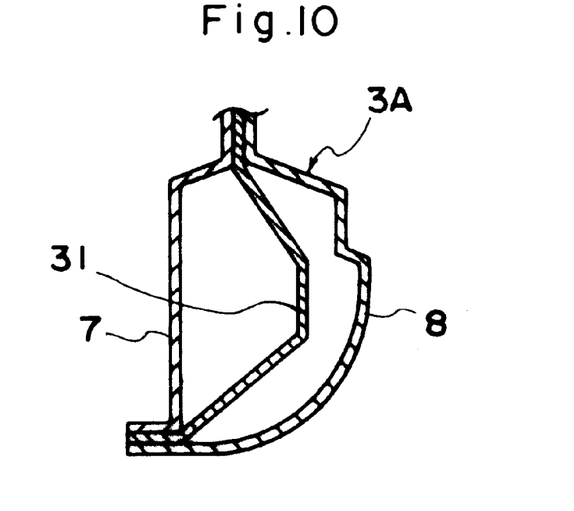
FIG. 10 shows a cross section of a first pillar along the horizontal direction in an example of a variation of the embodiment.
Figure 11:
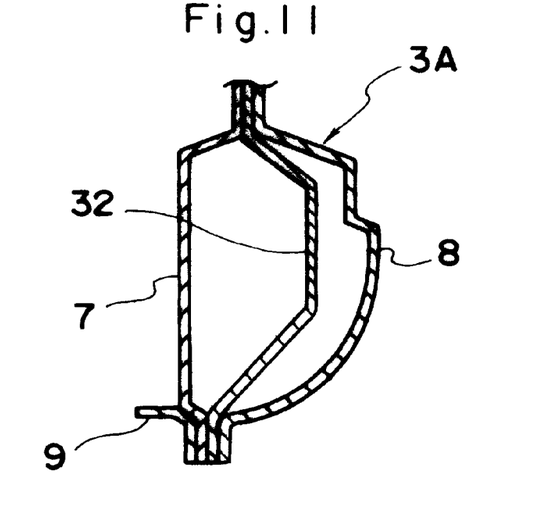
FIG. 11 shows a cross section of a first pillar along the horizontal direction in another example of a variation of the embodiment.

In FIG. 10, a longitudinal reinforcement member 31 with a cross section achieving a roughly "]" shape is sandwiched and clamped at the bonding areas of the inner panel 7 distended inward and the outer panel 8 distended outward in the back and forth direction of the operator's cab at two locations distanced from eachother. In FIG. 11, too, a longitudinal reinforcement member 32 is sandwiched and clamped at a bonding area of the inner panel 7 and the outer panel 8, as in FIG. 10. However, the shapes of the inner panel 7 and the outer panel 8 at the front are different from those in FIG. 10. By sandwiching and clamping the longitudinal reinforcement member 31 or 32 between the inner panel 7 and the outer panel 8, as illustrated in FIG. 10 or 11, the longitudinal reinforcement member 31 or 32 can be concurrently bonded while bonding the inner panel 7 and the outer panel 8 to achieve a reduction in the number of steps for manufacturing the operator's cab.

Figure 12:
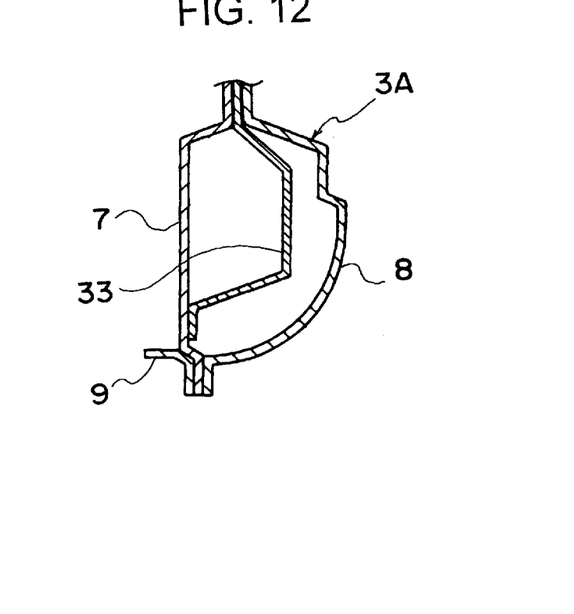
FIG. 12 shows a cross section of a first pillar along the horizontal direction in yet another example of a variation of the embodiment.

In FIG. 12, the rear end of a longitudinal reinforcement member 33 is sandwiched and clamped at a bonding area of the inner panel 7 and the outer panel 8, with its front end bonded to the inner surface of the distended inner panel 7. Providing such a longitudinal reinforcement member 33 will hide a bonding area of the longitudinal reinforcement member 33 within the pillar to achieve an esthetic improvement.

Figure 13:
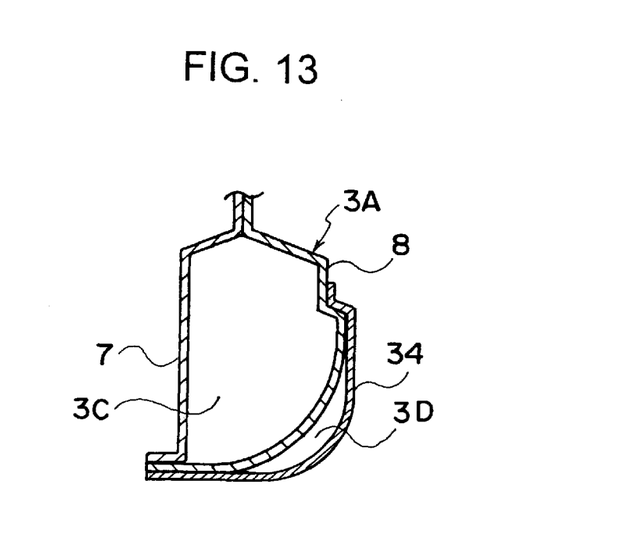
FIG. 13 shows a cross section of a first pillar along the horizontal direction in yet another example of a variation of the embodiment.

In FIG. 13, a longitudinal reinforcement member 34 is bonded to the outer surface of the outer panel 8 to form another hollow portion 3D adjacent to and outside of the hollow portion 3C provided between the inner panel 7 and the outer panel 8. By providing the longitudinal reinforcement member 34 at the outer surface of the outer panel 8 in this manner, even the operator's cab of an existing construction machine can be converted to achieve a structure provided with reinforcement members easily.

Figure 14:
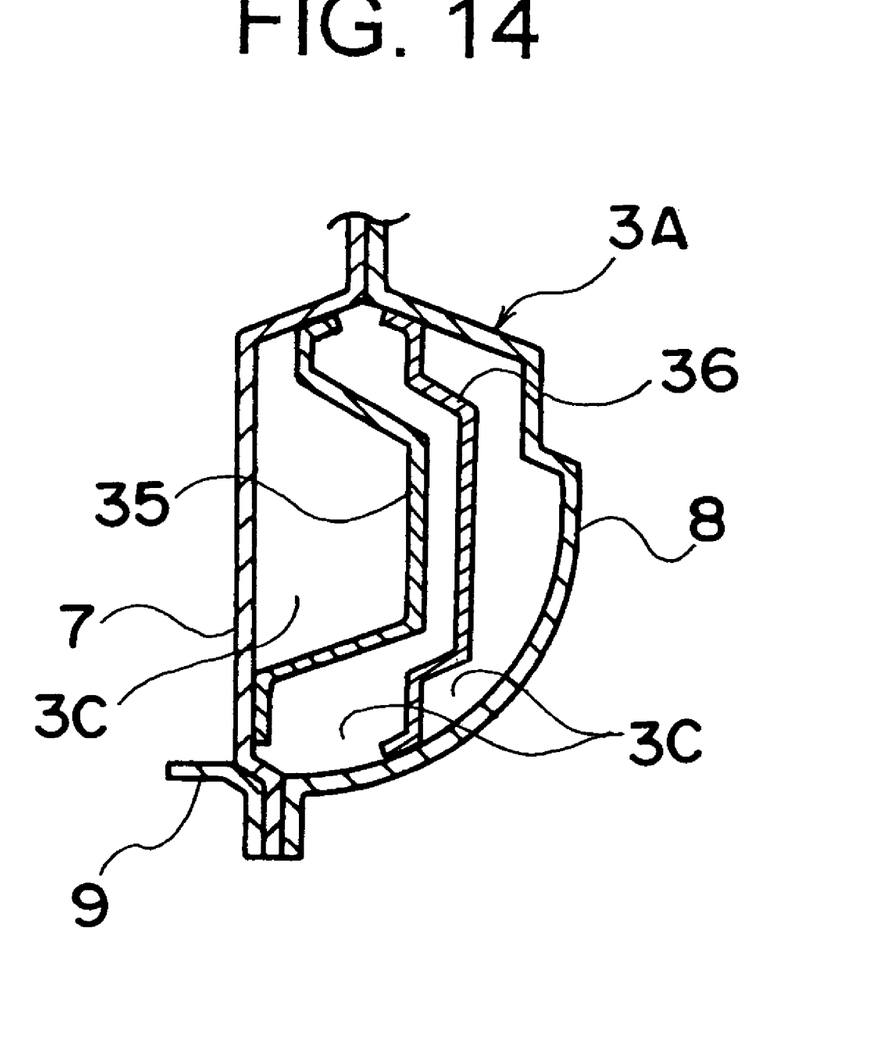
FIG. 14 shows a cross section of a first pillar along the horizontal direction in yet another example of a variation of the embodiment.

In FIG. 14, the front and rear ends of longitudinal reinforcement members 35 and 36 are bonded to the inner surface of the inner panel 7 and the inner surface of the outer panel 8 respectively within the hollow portion 3C provided between the inner panel 7 and the outer panel 8 to divide the hollow portion 3C into three portions. By providing two longitudinal reinforcement members 35 and 36 at the hollow portion 3C in this manner, the modulus of section of the first pillar 3A is further increased to provide a greater improvement in the strength of the operator's cab.

It is to be noted that the shapes of the reinforcement members 30, 40, 50 and 60 are not restricted to those adopted in the embodiment, and any other shapes may be adopted for them as long as they contribute to an improvement in the modulus of section.

Figure 15:
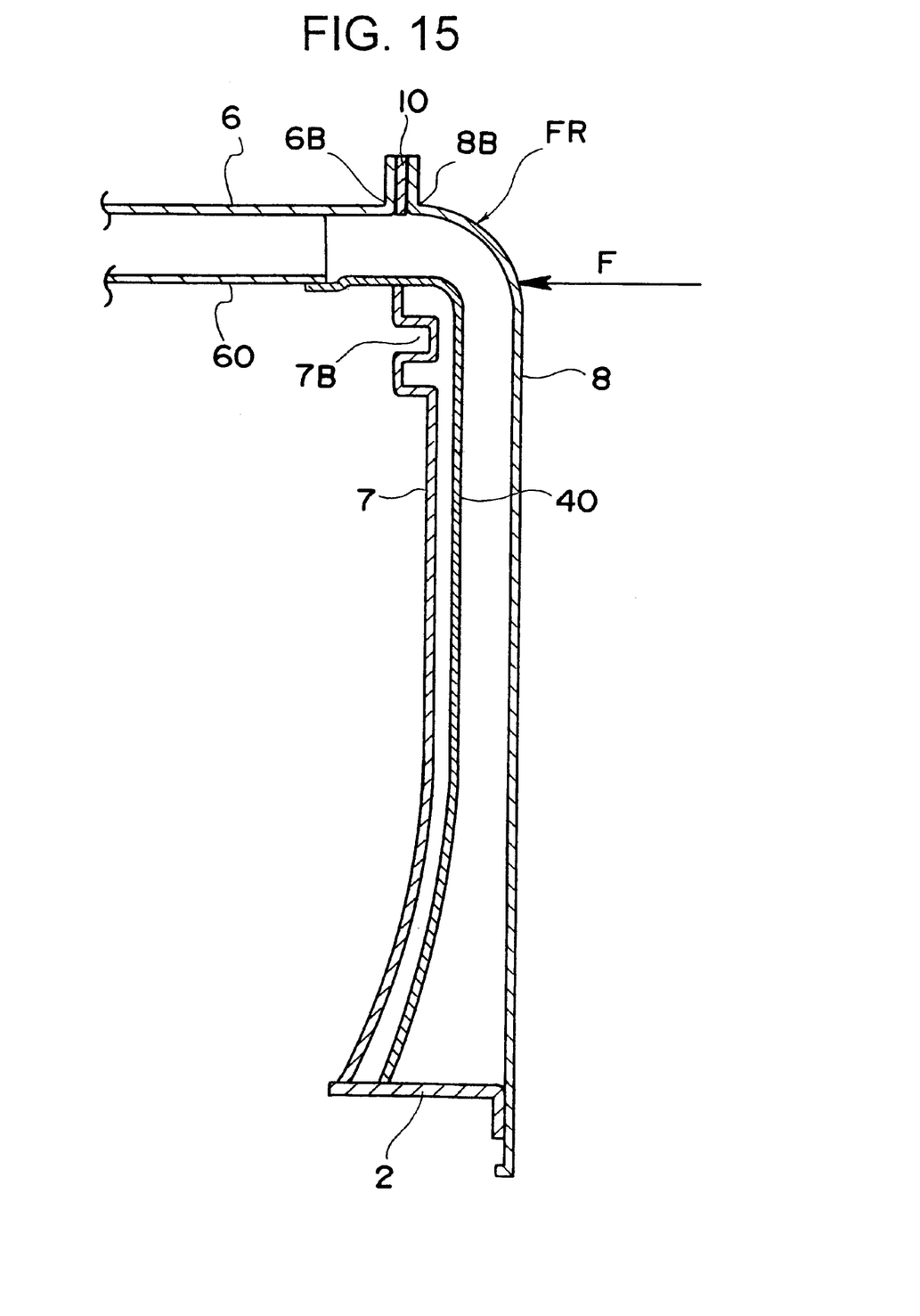
FIG. 15 shows a cross section of a second pillar along the vertical direction in an example of a variation of the embodiment.

In addition, while the inner panel 7 and the longitudinal reinforcement members 40 are positioned parallel to the outer panel 8 as illustrated in FIG. 6 in the embodiment, the positioning arrangement is not limited to this and the lower portions of the inner panel 7 and the longitudinal reinforcement members 40 may curve toward the inside of the operator's cab, as illustrated in FIG. 15, for instance. In other words, since the modulus of section near the bottom surface of the operator's cab (the low portion of the side surface of the operator's cab) is increased, any excessive bending stress near the bottom surface will be suppressed. This will further improve the flexural rigidity of the operator's cab frame FR against the tipping load F applied to the upper portion of the side surface of the operator's cab 1.

Figure 16:
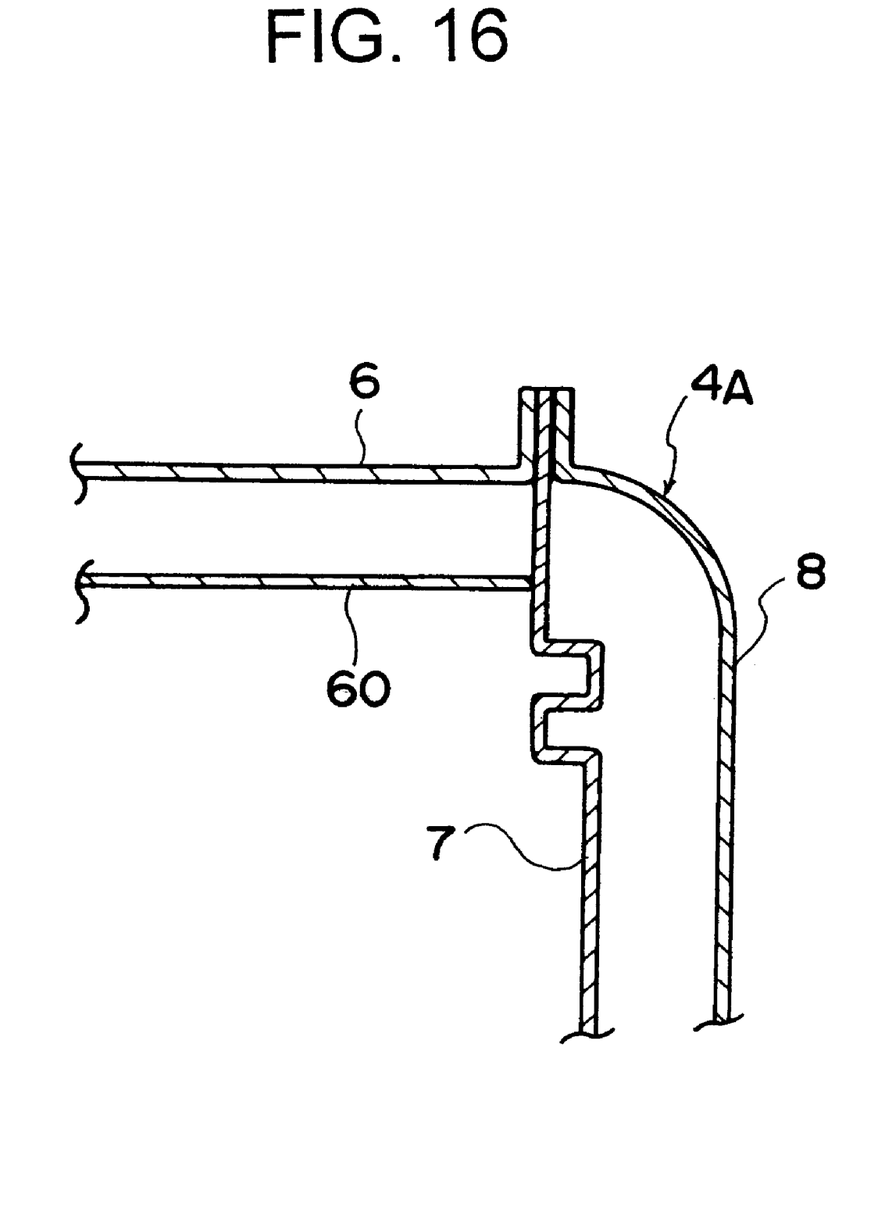
FIG. 16 shows a cross section the upper portion of the second pillar along the vertical direction in an example of a variation of the embodiment.

Furthermore, while the longitudinal reinforcement members 30, 40 and 50 and the lateral reinforcement member 60 are provided in the operator's cab 1 in the embodiment described above, only the longitudinal reinforcement members 30, 40 and 50 may be provided at the pillar portions 3A and 3B through 5A and 5B, or as illustrated in FIG. 16, which is a cross section of the upper portion of the second pillar 4A along the vertical direction, only the lateral reinforcement member 60 may be provided.

Figure 17:
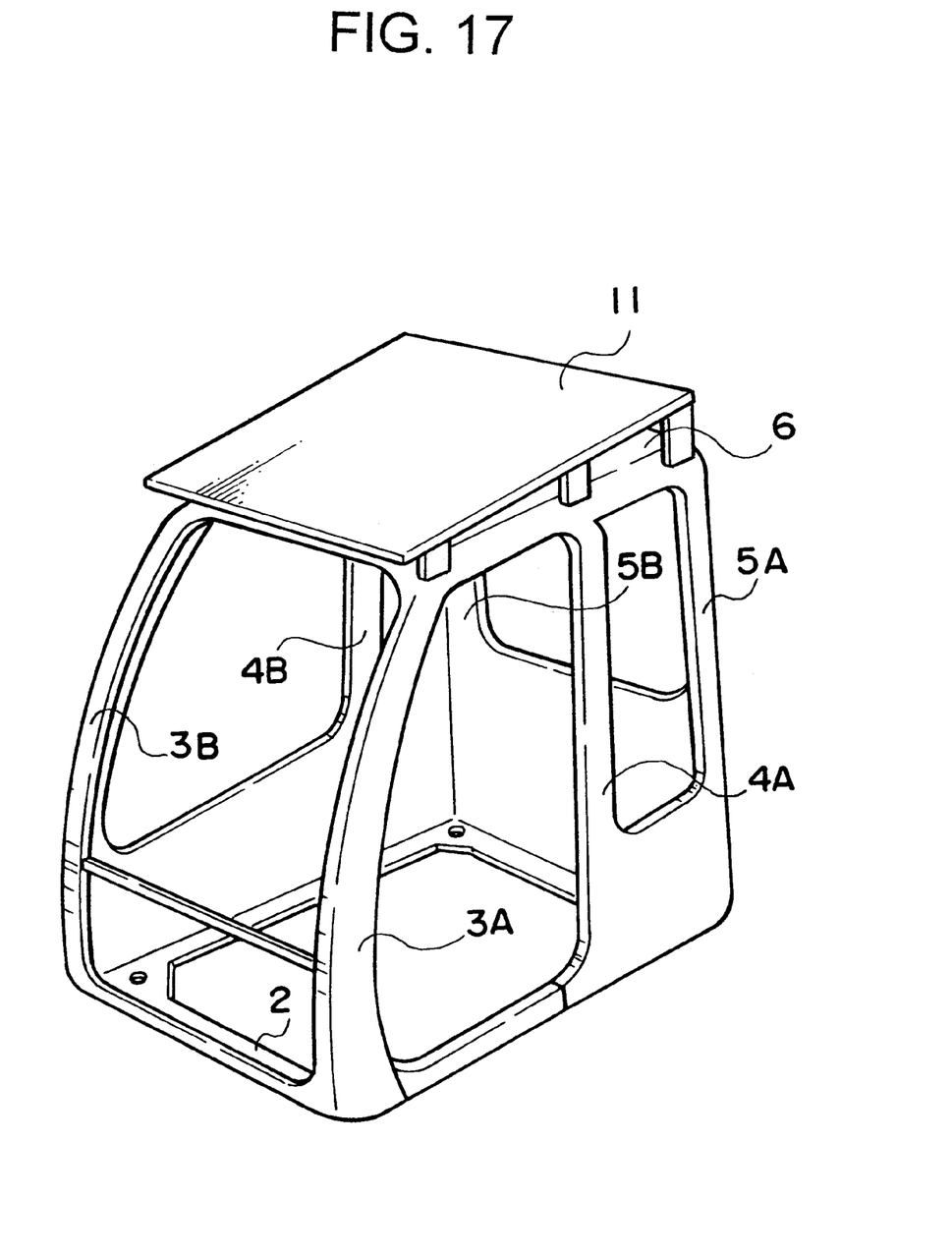
FIG. 17 shows the frame structure in an example of a variation of the operator's cab in the embodiment

Moreover, as illustrated in FIG. 17, which presents a perspective view of another frame structure for the operator's cab, a roof guard 11 supported by the reinforcement members 30, 40, 50 and 60 of the pillars 3A and 3B through 5A and 5B may be provided above the roof 6. This will further improve the rigidity of the roof 6 and also a sufficient degree of strength can be achieved for the operator's cab even against an object falling from above.

Also, while the longitudinal reinforcement members 30, 40 and 50 and the lateral reinforcement member 60 are mounted continuously from the base plate 2 to the upper surface via the side surfaces of the operator's cab 1 between the left and right in the embodiment described above, they may be provided non-continuously to be present intermittently only at locations that need to be reinforced to ensure strength. Accordingly, the base plate 2 and the longitudinal reinforcement members 30, 40 and 50 may not be bonded to each other and may be distanced from each other. In addition, the inner panel 7, the outer panel 8, the reinforcement members 30, 40, 50 and 60 and the like may be bonded together through welding, brazing, adhesive, bolts, rivets or bonded through any other method.

In the above embodiments, it is explained that the longitudinal reinforcement members 30, 40 and 50 are provided in the pillars 3A and 3B through 5A and 5B, respectively. However, all pillars may not be provided with the longitudinal reinforcement members, and only one of pairs of the pillars 3A and 3B through 5A and 5B may be provided with the longitudinal reinforcement members, or two of pairs of the pillars 3A and 3B through 5A and 5B may be provided with the longitudinal reinforcement members. Since the strength of the front surface of the operator's cab may be maintained to the certain degree by the front panel 9 and the strength of the rear surface of the operator's cab may be maintained to the certain degree by the rear panel 10, only the mid pillars 4A and 4B that do not have such a panel around there can be provided with the longitudinal reinforcement members 40. By this means, the strength of the operator's cab is effectively improved with small amount of materials. Furthermore, since the strength of the portion that is the closest to the operator is improved, safety is effectively improved with small amount of materials or members.

What is claimed is:

1. An operator's cab in a construction machine in which hollow pillar portions are formed each with an outer panel and an inner panel bonded to each other and the hollow pillar portions constitute an operator's cab frame, comprising:

at least one reinforcement member constituted of thin plate that is bonded to either one of said outer panel and said inner panel to divide an internal space of each of said hollow pillar portions, a bonding portion of said at least one reinforcement member being not sandwiched between said outer panel and said inner panel;

a bottom portion, a base plate constituting the bottom portion, and the at least one reinforcement member bonded to the base plate.

2. An operator's cab in a construction machine according to claim 1, wherein a modulus of section in each of said hollow pillar portions is gradually increased toward a bottom surface of said operator's cab frame to lessen bending stress at said hollow pillar portion.

3. An operator's cab in a construction machine according to claim 1, wherein said hollow pillar portions are each constituted of elongated space and said at least one reinforcement member is provided along a direction of length of said elongated space.

4. An operator's cab in a construction machine according to claim 1, wherein said hollow pillar portions are provided at, at least, one set of left and right ends among left and right ends at a front surface of said operator's cab, left and right ends at a rear surface of said operator's cab and left and right ends in a middle area located between said left and right ends at said front surface and said left and right ends at said rear surface of said operator's cab.

5. An operator's cab in a construction machine according to claim 1, wherein a cross sectional shape of said at least one reinforcement member is formed by bending the thin plate.

6. An operator's cab in a construction machine according to claim 5, wherein a cross sectional shape of said at least one reinforcement member has a roughly square bracket shape.

* * * * *